May 24, 1949.　　　　　L. E. ASKE　　　　　2,470,968
RHEOSTAT CONTROL DEVICE
Filed June 27, 1945　　　　　　　　　　　　4 Sheets-Sheet 1
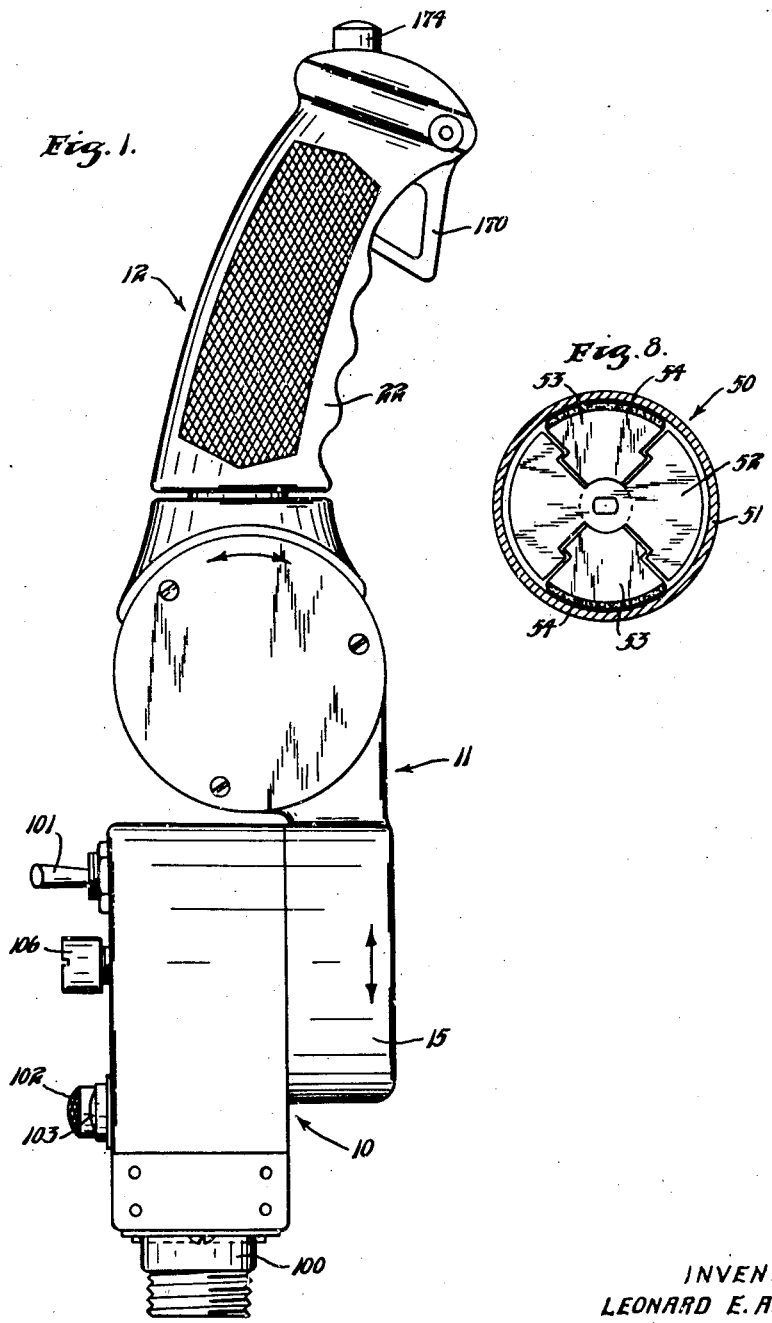
INVENTOR
LEONARD E. ASKE
BY George H. Fisher
ATTORNEY May 24, 1949. L. E. ASKE 2,470,968
RHEOSTAT CONTROL DEVICE
Filed June 27, 1945 4 Sheets-Sheet 2
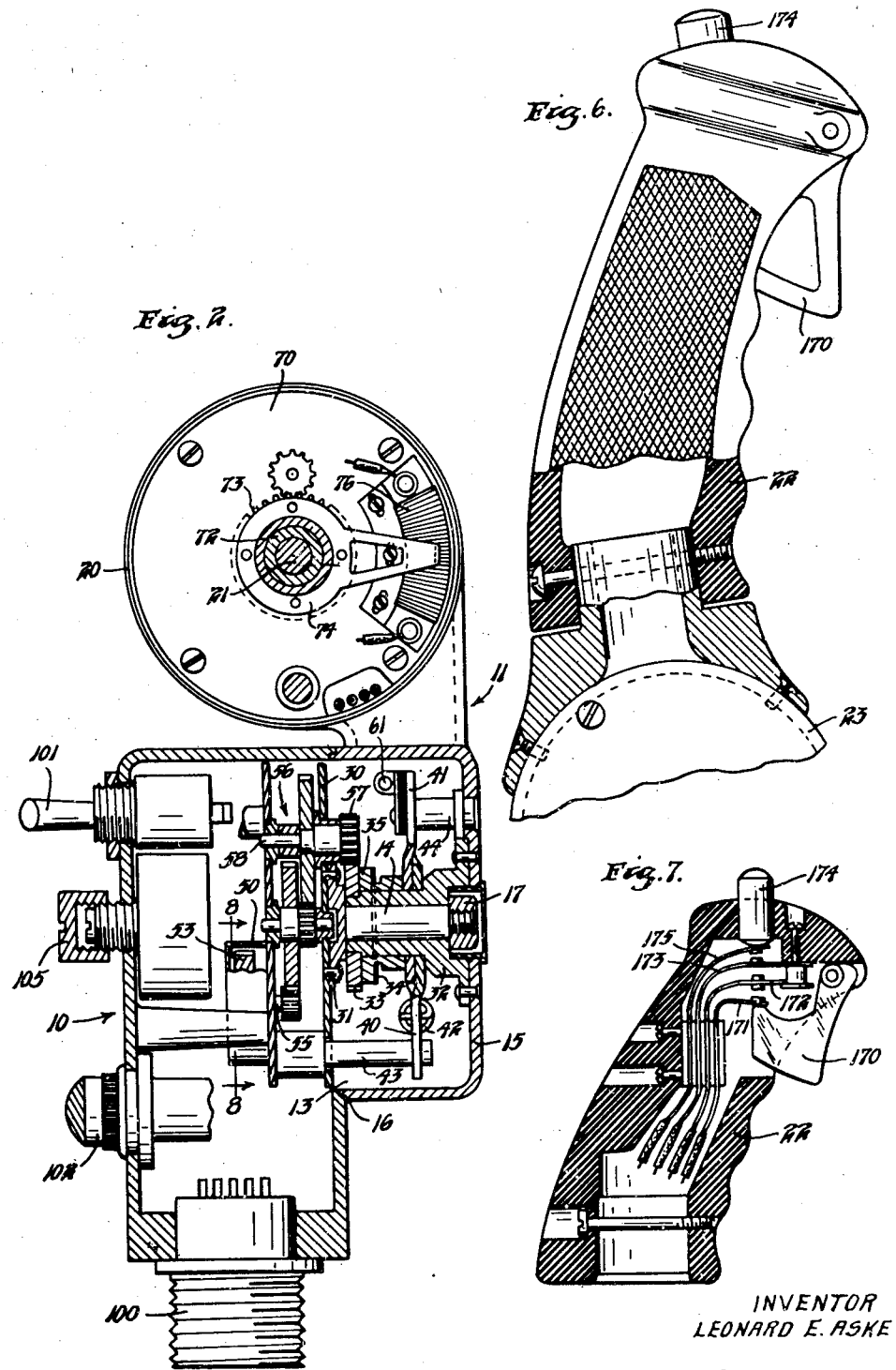
INVENTOR
LEONARD E. ASKE
BY George N. Fisher
ATTORNEY May 24, 1949.  L. E. ASKE  2,470,968
RHEOSTAT CONTROL DEVICE
Filed June 27, 1945  4 Sheets-Sheet 3
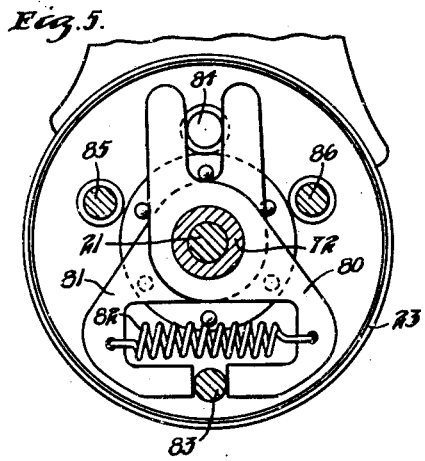
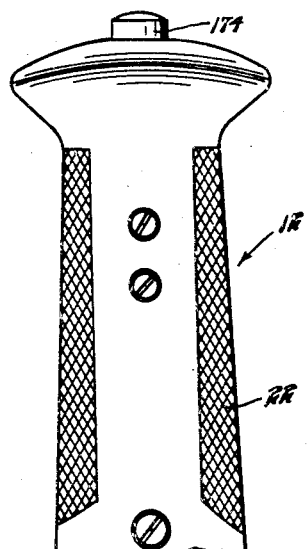
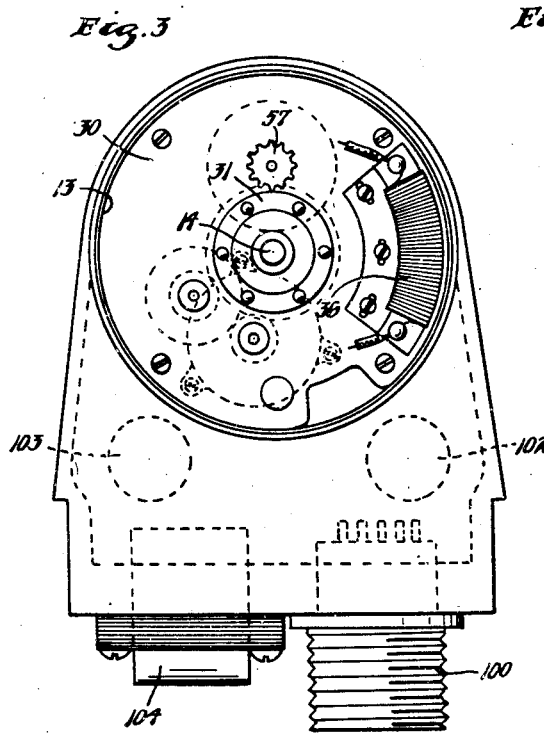
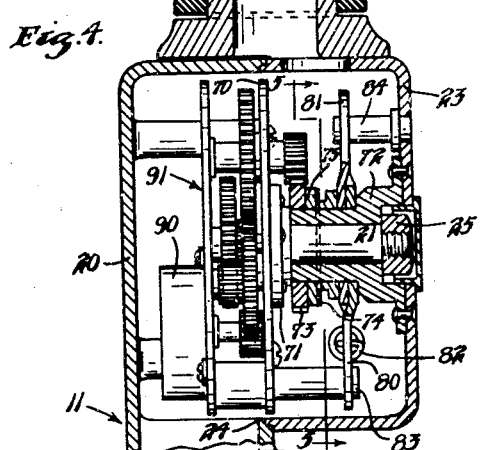
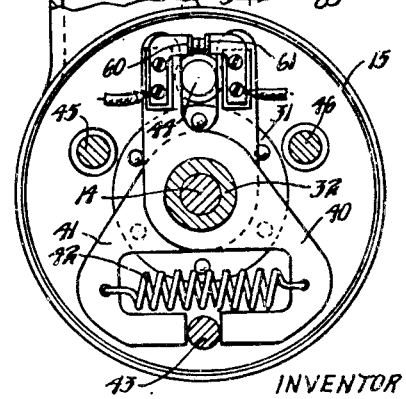
INVENTOR
LEONARD E. ASKE
BY George H. Fisher
ATTORNEY

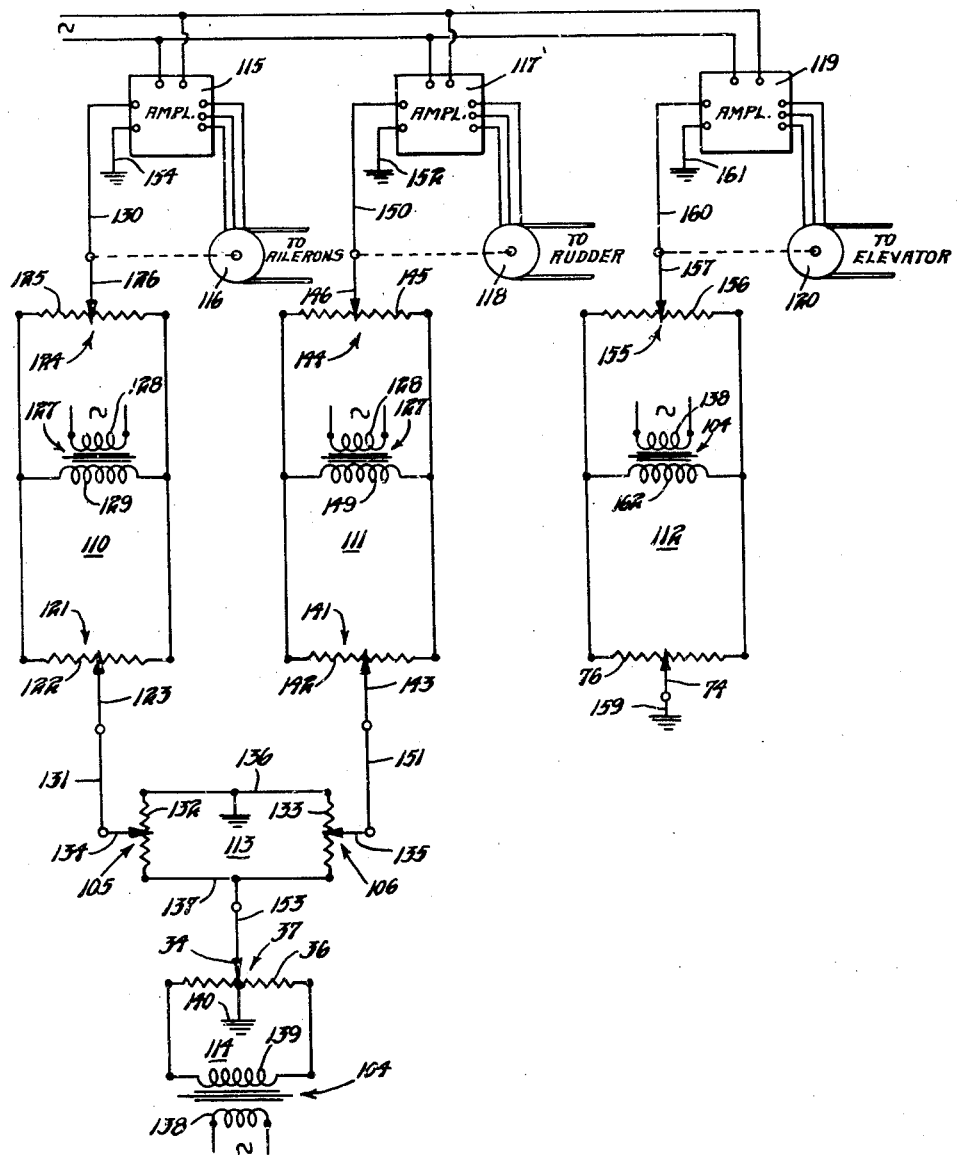

Patented May 24, 1949

2,470,968

UNITED STATES PATENT OFFICE 2,470,968

RHEOSTAT CONTROL DEVICE

Leonard E. Aske, Minneapolis, Minn., assignor to Minneapolis-Honeywell Regulator Company, Minneapolis, Minn., a corporation of Delaware Application June 27, 1945, Serial No. 601,815

17 Claims. (Cl. 201—48)

My invention relates generally to manually operable controllers and more particularly to such controllers which may be used to control simultaneously two or more independent control systems.

In the operation of control systems, particularly those systems in which a motor positions an object, it is often desirable to be able to control the position of the object so that it will come to rest at a point intermediate of its two limiting positions. To secure this result, a rebalancing system is often used, consisting of a control impedance, and a rebalancing impedance connected in parallel with the control impedance and varied in accordance with the position of the object being controlled. A source of electrical energy is then connected to the two impedances, and the output of the two impedances may be used in the manner of the well-known Wheatstone bridge to control the operation of the motor. Such systems are well-known in the control art, and I do not claim them as my invention.

It is often desired to operate such controls manually, and in this event it is a simple matter to provide a potentiometer or other form of variable impedance which may be controlled by merely turning a knob. However, when two or more control systems are to be operated simultaneously, each system being controlled independently of the other, difficulty is experienced by the operator in controlling both systems accurately by means of knob-operated potentiometers, especially if one hand must be free to operate other control devices.

Such a condition arises where it is desired to operate the control surfaces of an aircraft by a motor means, for although the ailerons and rudder may usually be operated together, the elevator must be operated separately, and in addition, the pilot must have one hand free to operate the throttle controls and other controls of the aircraft.

One form of controller which may be used under such conditions is shown in the application of Robert J. Kutzler and Theodore J. Wilson, Serial No. 570,712, filed December 30, 1944. However, there are certain limitations in the controller disclosed in that application, and I have designed an improved controller.

It is therefore a major object of my invention to provide a control device which may be used to control simultaneously and independently two separate control systems.

It is another object of my invention to provide such a control device which has a normally centered or neutral position to which it is returned whenever displaced therefrom.

It is a further object of my invention to provide such a controller in which the force necessary to move the controller in one direction is greater than that required to move it in another direction.

It is still another object of my invention to provide means for damping the action of springs which return the controller to center so as to prevent hunting or oscillation of the controller about its neutral position should it suddenly be released when in a displaced position.

It is a still further object of my invention to provide a controller which may be used to great advantage in aircraft to operate control surfaces thereof.

These and other objects of my invention will become apparent in the following description of a preferred form thereof and from the drawings illustrating that form in which Figure 1 is a side elevational view of my controller, Figure 2 is a larger view, similar to Figure 1, and with parts cut away to show the interior construction of the lower portion of the controller, Figure 3 is a view of the fixed member of the controller, taken from the right-hand side of Figure 2, and with the movable members of the controller removed, Figure 4 is a view of the lower movable member and upper movable member with the upper portion of the lower movable member cut away to show the arrangement of the parts contained therein, Figure 5 is a view taken at 5—5 in Figure 4 and showing the centering means used in my device, Figure 6 is a side elevational view of the handle forming the principal portion of the upper movable member, with a portion of the handle broken away to show its method of attachment, Figure 7 is a cross sectional view of the handle shown in Figure 6, showing the switches included therein, Figure 8 is a view taken at 8—8 in Figure 2 and showing the construction of the centrifugal brake which I prefer to use, and Figure 9 is a schematic wiring diagram of a control system in which my controller may be used.

Referring now to the drawings and particularly to Figure 1 thereof, it will be seen that my controller comprises three major portions: a base or fixed portion 10, a lower movable portion 11 pivotally attached to the base member 10, and a handle or upper movable portion 12 which is pivotally attached to the lower movable portion 11. As shown in Figure 1, the lower movable portion 11 is pivoted for movement in a plane perpendicular to the plane of the drawing, and this is indicated by the double-headed arrow shown on this member; the upper movable member 12 is pivotally attached to lower movable member 11 for movement to the right or left in the plane of the drawing. As a result, the upper portion of the upper movable member 12 may be moved in two planes: the first plane determined by the movement of the upper movable member 12 about its pivoted connection to member 11, and the other plane determined by the movement of the lower movable member 11 about its pivoted connection to the fixed member 10.

As shown in Figure 2, the fixed member 10 consists of a housing having a circular opening 13 in one side thereof in which there is mounted a centrally located stud 14. The lower end of the lower movable member 11 is circularly shaped and cooperates with the circular opening 13 to provide a central housing 15 containing the lower pivoted joint. The abutting edges of the central housing 15 and the lower housing 10 are formed to provide a step-joint 16 which permits the rotation of central housing 15 with respect to the lower housing 10 while at the same time reducing the amount of dirt and other foreign material which may enter through this joint. To hold the central housing 15 to the lower housing 10, a nut 17 is applied to the outer end of the centrally located stud 14 where it projects through the central housing 15. The upper end of the lower movable member 11 is also enlarged to form a circular housing 20 which is oriented with respect to the central housing 15 so that the two have their axes perpendicular to each other. A centrally located outwardly extending stud 21, threaded on its outer end, is provided in housing 20, similar to the centrally located stud in the central housing 15.

The upper movable member 12 consists principally of a handle or grip 22 connected to a cylindrical member 23 which cooperates with the upper housing 20 to completely enclose the mechanism contained within the latter members. A step-joint 24, similar to the step-joint 16, permits the rotation of the cylindrical member 23 with respect to the upper housing 20 while preventing the admittance of dirt to the interior; and the stud 21 extends through the cylindrical member 23 so that a nut 25 may be applied to its outer end to hold the cylindrical member 23 to the upper housing 20.

Within the housing 10 and adjacent the opening 13, I provide a partition plate 30 which is rigidly attached to the housing 10 in any suitable manner. It is to this partition plate 30 that the stud 14 is attached, as by providing a head 31 on the stud which may be riveted or otherwise suitably attached to the partition plate. A hollow shaft 32 cooperates with the stud 14 to form a bearing surface for supporting the central housing 15, and is provided with a flange at its outer end by which the shaft may be rigidly attached to the central housing 15. Mounted on the free end of hollow shaft 32 for rotation therewith is a gear 33, whose purpose and function will be hereinafter described; and potentiometer wiper 34 is attached to a collar 35 so that both the wiper and the collar will also rotate with the shaft 32. The wiper 34 is not shown in full view in any of the drawings, but a wiper similar to it in all respects is shown at 74 in Figure 2.

Mounted on the partition plate 30 and adapted to be engaged by the potentiometer wiper 34 is an arcuately shaped potentiometer resistor 36, suitably insulated from the partition plate and all other conducting surfaces, and which, with the wiper 34, forms a potentiometer 37. As shown, I prefer to mount the resistor 36 on the partition plate 30 by means of three screws which fit through slotted holes in the resistor mounting, for I may then rotate the resistor slightly so that the potentiometer wiper 34 will normally be in the center of the resistor. It will thus be seen that as the central housing 15 is rotated about the stud 14, the wiper 34 will be moved across the resistor 36, and this operation of the potentiometer may be used in a suitable control circuit.

To insure that the central housing 15 returns to its position with respect to the housing 10 where the wiper 34 is centered with respect to the resistor 36, I provide the spring centering means shown in Figure 4. This centering means is adapted to return the central housing 15, and with it the lower movable member 11 and the upper movable member 12, to a predetermined position whenever these elements are displaced from that position. In order that the various elements of my controller may be kept to a reasonable size, it is necessary that the spring means used to center the lower movable member 11 be quite compact. Furthermore, as will become apparent later, the force exerted by the spring must be great enough to return the movable portions of the controller to their normal position against a certain amount of friction loading. It is also very desirable to have the spring rate of the centering means remain substantially constant as the lower movable member 11 is displaced from its normal position. As used in this specification and the appended claims, the term "spring rate" means the change in the amount of force applied to a spring to change its displacement one unit. For example, if a spring has its load changed from zero to 10 grams, and its length changed one centimeter, its spring rate would be 10 grams per centimeter; and if, when the loading were changed from 90 to 100 grams, the displacement were likewise 1 centimeter, the spring would be said to have a constant spring rate. While it is not absolutely essential that the spring centering means used in this controller have a constant spring rate, such a feature is very desirable and makes possible more accurate control of the movement of the controller, and consequently of the device being positioned.

From the above discussion, it will be apparent that special means must be used to provide the spring centering features desired, and in Figures 2 and 4 I have illustrated the form which I have found to be very satisfactory for this purpose. As illustrated there, I prefer to provide first and second pivoted arms 40 and 41, respectively, mounted on the hollow shaft 32 for rotation with respect thereto. The arms 40 and 41 are crossed at their pivot point so that a scissors-like movement is obtained, and the upper ends of the arms move apart when the lower ends are moved apart, and vice versa. At the lower ends of the arms 40 and 41 I provide a tension spring 42 connecting the lower ends and urging them and the upper ends of these arms together. Since the pivoted arms 40 and 41 are rotatable upon the shaft 32, some fixed member must be provided for the spring 42 to act against. In the form shown, this fixed member consists of a stud 43 mounted on the partition plate 30 and extending generally outwardly in a direction substantially parallel to the centrally located stud 14. The arms 40 and 41 are now normally held in a predetermined position with respect to the housing 10, and if either or both of them are displaced from this position, a force will be exerted by the spring 42 tending to return them to that position.

To make use of this result, I provide a stud 44, attached to the central housing 15 (as best shown in Figure 2) extending toward the partition plate 30, and located so as to be between the upper ends of the pivoted arms 40 and 41. Stud 44, since it is attached to the central housing 15 and moves with the latter about the centrally disposed stud 14, may be termed the rotatable stud as distinguished from stud 43 which is attached to the partition plate 30 and may be called the fixed stud.

It will now be seen that if the upper end of the handle 22 is moved to the left, in Figure 4, the fixed stud 43 will remain where it is and the rotatable stud 44 will be moved counterclockwise with the handle member 22. As a result, the rotatable stud 44 will bear against the first pivoted member 40 and move the latter in a counterclockwise direction, while the lower end of the second pivoted member 41 will bear against the fixed stud 43 and be held against rotation. This operation will separate both the upper and lower ends of the pivoted members 40 and 41 and increase the tension in the spring 42. As soon as the force moving the handle member 22 to the left is reduced, the spring 42 will urge the rotatable stud 44 in a clockwise direction and thereby return the handle 22 toward its original position. When the displacing force applied to the handle 22 is completely removed, the spring 42 will return the handle to its original predetermined position.

To limit the movement of the handle 22, stops are provided consisting the studs 45 and 46, attached to the central housing 15 and adapted to bear against pivoted arms 40 and 41, respectively, when the predetermined limits of rotation have been reached. It may be shown that the use of a spring centering means consisting of the pivoted arms 40 and 41 and the tension spring 42 will provide a system having a substantially constant spring rate within the normal limits of travel of the handle 22; and by pivoting the arms 40 and 41 so that they rotate about the hollow shaft 32, it will be seen that a very compact arrangement has been provided.

It will thus be seen that I have provided a compact spring centering means for the lower movable member 11 which has a substantially constant spring rate within the limits of travel of that member. However, if the member 12 were moved to its extreme position in one direction and then suddenly released, the momentum of the lower movable member 11 and the upper movable member 12 which is attached to it would be sufficient to cause the lower movable member to go past its center position and to the right thereof before it is stopped, thereby moving arm 41 away from the fixed stud 43 and causing arm 41 to return the rotatable stud 44 to its predetermined position. This condition of overshooting or hunting is very undesirable, since, depending upon the object that is being positioned, the overshooting of the control device may be undesirable or even fatal. Consequently, I have provided friction means to reduce this tendency to hunt; and the resulting combination produces a device which quickly returns to center position when released but does not overshoot.

It will be seen that the frictional force applied to restrain the movement of the lower movable member 11 should be variable so that when the member is moving slowly, the frictional restraint will be small. This will mean that when the lower movable member 11 is only slightly displaced from its centered position, the frictional restraint will be very slight and the tension spring 42 may center the member accurately. While there are several different methods of providing a restraining force meeting these requirements, one very satisfactory method is the use of a centrifugal brake 50, and this is the method I prefer to use.

While various forms of centrifugal brakes are known, the type I prefer to use is shown in Figure 8. It will there be seen that the brake 50 includes a cylindrical drum 51 which contains a concentric rotor 52 whose periphery is spaced from the drum 51 so that there is no rubbing or friction between the two. In the form shown, the rotor 52 consists of two diametrically opposed, substantially sector shaped portions, and the space between these two sector portions is occupied by complementally shaped brake members 53 which are caused to rotate by the rotor 52. These braking members 53 may be made of a single material throughout, or they may be provided with a braking surface 54 of another material.

The brake members 53 are free to move radially between the limits defined by the cylindrical drum 51 and the rotor 52. As a result, when the rotor 52 is turned, the brake members 53 will be turned with it and will experience a centrifugal force which will urge them outwardly against the drum 51. The resulting friction between the brake surfaces 54 and the drum 51 will act as a drag on the rotor 52; and the faster the rotor is turned, the greater will be the centrifugal force acting upon the brake members 53 and hence the greater will be the drag or restraining force acting on the rotor 52.

The rotor 52 is driven by a shaft 55, shown in Figure 2. It will be apparent that for satisfactory operation, the rotor 52 must be turned at a speed sufficient to force the brake members 53 outwardly with a fair amount of pressure. Since the stops 45 and 46 limit the rotation of the lower movable member 11 to a portion of a revolution, it will be apparent that the centrifugal brake 50 cannot be satisfactorily driven directly from the central housing 15. To provide a suitable connection between the central housing 15 and the centrifugal brake 50, I therefore provide a gear train 56 having a relatively high ratio of transformation. By way of example only, and not as a limitation, I have found that a gear train which provides very satisfactory operation is one having a ratio such that one revolution of the central housing 15 will produce 160 revolutions of the output shaft. While the value of this ratio is not critical, it should be sufficient to provide a sufficient braking force for the anticipated speed of movement of the lower movable member 11.

The purpose of the gear 33 will now become apparent. This gear, which is mounted on the hollow shaft 32, rotates with the central housing 15 and is adapted to mesh with a pinion 57 mounted on the input shaft 58 of the gear train 56. The final output shaft of the gear train 56 is the shaft 55 which drives the rotor 52 of the centrifugal brake 50, and a variable frictional force is thus applied to restrain the movement of the lower movable member 11, the amount of this restraint varying with the speed of movement.

It will now be seen that I have provided a manually operated controller having a first or lower movable member 11, pivotally attached to a fixed member or housing 10, and which may be moved or pivoted in one plane to control a variable impedance or potentiometer 37 consisting of a wiper 34 and a resistor 36. Furthermore, when the lower movable member 11 is displaced from a predetermined normal position, a spring centering means, including the pivoted arms 40 and 41 and the spring 42, acts to return the lower movable member 11 to its normal position; and any movement of the lower movable member 11 is restrained by the action of the centrifugal brake 50 driven by the rotation of the central housing 15 and transmitted through the gear train 56. The amount of restraint provided by the centrifugal brake 50 will be dependent upon the speed of movement of the lower movable member 11, and this will prevent too rapid movement of the controller by the operator, and also prevent over-shooting or hunting of the lower movable member 11 when it is returned to center by the action of the spring 42.

The device thus far described, however, provides only a single control impedance; and to make provision for all the functions for which this device is designed, a second variable impedance must be provided which is capable of simultaneous and independent control while the first impedance is controlled. I have therefore provided a second spring centering device, a second control impedance, and a second centrifugal brake within the upper housing 20 and the cylindrical member 23.

In Figures 2, 4, and 5 is shown the internal construction of the spring centering means, the variable impedance, and the centrifugal brake and associated equipment. The construction and arrangement of all of these elements is very similar to those in the central housing 15 and fixed member 10. Thus, as seen in Figure 4, a partition plate 70 is rigidly mounted in the upper housing 20 and carries the centrally located stud 21 thereon, held by a suitably enlarged head 71. A hollow shaft 72, centrally located with respect to the cylindrical member 23 and attached thereto, slips over the centrally located stud 21 and acts as a bearing member for the cylindrical member 23. A gear 73, similar to gear 33 in the central housing 15, is mounted on the end of hollow shaft 72 for rotation with the shaft, and a potentiometer wiper 74 is attached to a collar 75 likewise carried by the hollow shaft 72 and rotated with it. A potentiometer resistor 76, adapted to have the potentiometer wiper 74 bear against it, is suitably mounted on the partition plate 70; and it will thus be seen that as the handle member 22 is pivotally moved about the centrally located stud 21, the wiper 74 will be moved across the resistor 76 to provide a variable impedance which may be used in a suitable control circuit.

To return the handle member 22 and the associated cylindrical member 23 to a predetermined position with respect to the lower movable member 11, a spring centering or return means is provided similar to that provided in the centrally disposed housing 15. As in the previously described centering means, first and second pivoted arms 80 and 81 are mounted on hollow shaft 72 for rotation with respect thereto and are connected at their lower ends by a tension spring 82. The pivoted arms 80 and 81 are crossed in the manner of scissors, and the tension spring 82 thus urges both the upper and lower ends of the pivoted arms together. A fixed stud 83, mounted on the partition plate 70, provides a stationary member against which the spring 82 may bear; and a rotatable stud 84 is mounted in the cylindrical member 23 so as to extend between the upper ends of the pivoted arms 80 and 81 and move them apart against the urging of the spring 82 when the cylindrical member is rotated. Stops 85 and 86, mounted on the cylindrical member 23, limit the motion of the pivoted arms 80 and 81, respectively, and thus limit the degree of motion of the cylindrical member 23 and its attached hand grip 22. The operation of the spring centering means just described is identical with that of the spring centering means located in the central housing 15 and previously described, and that description will not be repeated here.

To restrain the motion of the handle member 22 with respect to the lower movable member 11, a centrifugal brake 90, similar to the centrifugal brake 50 previously described, is driven by means of gear 73 on hollow shaft 72 through a gear train 91, similar to gear train 56. The effect of the centrifugal brake on the movement of the handle member 22 with respect to the lower movable member 11 is similar to the effect of centrifugal brake 50 upon the movement of the lower movable member 11 with respect to the fixed member or housing 10.

Since the handle 22 is pivoted for movement about the centrally disposed stud 21, and since the lower movable member 11 is pivotally mounted for movement about the centrally located stud 14, it will be seen that when the handle 22 is pivoted about the stud 21, the applied force will be acting through a relatively short lever arm. Similarly, when the handle 22 is moved in a direction parallel to the axis of the centrally disposed stud 21, the handle 22 and the lower movable member 11 will both pivot about the centrally disposed stud 14 and the applied force will be acting through a much longer lever arm. Under these conditions, if the same amount of force is to be applied to the handle 22 to move it in either of these two directions, it will be seen that spring 82 in the cylindrical member 23 must be much lighter, or have a much lower spring rate, than spring 42 in the central housing 15.

However, I have found that by making the springs 42 and 82 so that they both have the same spring rate, a very desirable result is obtained, since the handle 22 is normally mounted so that it will pivot forward and backward about the centrally located stud 21, while it is moved from side to side when it pivots about the centrally located stud 14. When the handle 22 is moved forward and backward, the entire strength of the operator's arm is available to cause this movement, since both the upper arm and the forearm are active under these conditions. However, when the handle 22 is moved from side to side, only the wrist and forearm muscles are available for this motion, and hence it is desirable that a much smaller operating force be required in order to reduce fatigue.

It will thus be seen that I have provided a controller which may be moved in two planes, with the movement in each plane controlling a separate and independent variable impedance. In addition, the controller is provided with a spring return means which insures that when not physically held from its neutral position, it will return to this predetermined position; and because of the action of the centrifugal brake, there will be no hunting or overshooting of the controller when it is returned to this position. Furthermore, the force required to move the controller is coordinated with the strength of the muscles used to move it in the different planes, so that less force is required to move the handle 22 in the plane where the weaker muscles are called upon to move it.

While the elements I have described are sufficient to provide a complete and very satisfactory controller, certain accessory equipment is very often desirable, as in the case when this controller is used to operate the control surfaces of an aircraft.

In Figures 2, 6, and 7, I have shown certain of this auxiliary equipment which may be included with the controller in a single structure when the latter is used as a control for aircraft. As shown in Figure 2, a separable connector 100 may be mounted in the base of the fixed housing 10 through which all electrical connection may be made. A switch 101 is illustrated for energizing the controller and its associated equipment, and an indicator light 102 is provided to indicate when the system is energized and operable by the controller. An emergency disconnecting switch 103, shown in Figure 3, may be installed if this seems desirable, and a transformer 104 may be provided if its inclusion in the controller housing seems preferable. The inclusion of the switch 101, the indicator light 102, the emergency disconnecting switch 103, the transformer 104 is illustrated as one possible manner of constructing the controller and including some of the auxiliary equipment in it, but it is to be understood that this is for purposes of illustration only and that the actual construction will be determined by the type of control system operated by the controller and the purpose for which the controller is used.

If, as is contemplated herein, the controller is used to direct the flight of an airplane, the potentiometer consisting of the resistor 76 and the wiper 74 may well be used to control the position of the elevator surfaces, and the potentiometer 37 consisting of the resistor 36 and the wiper 34 may be used to control the direction of the plane in azimuth. While it is possible to turn an airplane in azimuth using only the rudder or the ailerons, for a properly coordinated turn it is necessary that both sets of control surfaces be moved. The amount by which the rudder must be deflected for a given deflection of the ailerons varies with each individual plane; and for this and for other reasons, it is necessary that the ailerons and rudder of an airplane be controlled by separate control systems. While these two systems may have certain parts which are common to both systems, means must be provided to secure the proper amount of signal in each individual system independently of the amount of signal supplied to the other system. For this purpose I have provided a pair of adjusting potentiometers, one of which is indicated at 105 in Figure 2. The other potentiometer 106, similar to the adjusting potentiometer 105, is not seen in this view but is indicated schematically in the circuit diagram hereinafter discussed.

Under certain conditions, it may be desirable to have a switch operated when one of the movable members is displaced from its normal or centered position. To provide for this, I have shown a pair of contacts 60 and 61, mounted on the upper ends of the first and second pivoted arms 40 and 41. The contacts 60 and 61 are suitably insulated from the arms, and are positioned so that they normally bear against each other. However, when the lower movable member 11 is displaced from its normal position, one of the arms 40 and 41 is rotated with respect to the other, the contacts 60 and 61 are separated, and their circuit is broken. If a normally open circuit is desired, a relay may be used, or some other well known type of switch may be substituted.

Description of Figure 9

Considering now the schematic circuit diagram shown in Figure 9, it will be seen that I have provided three bridge systems: 110, 111, and 112, to control the ailerons, rudder, and elevator of the airplane, respectively. The aileron bridge 110 and the rudder bridge 111 are connected together through an adjusting network 113, and this is in turn connected to a controlling network 114. One of the output terminals of the aileron bridge 110 is connected to an amplifier 115 whose output controls the operation of a servo motor 116 which is connected by cables to the ailerons (not shown) of the airplane. Similarly, one of the output terminals of the rudder bridge 111 is connected to an amplifier 117 whose output controls the operation of a servo motor 118 which is connected by cables to the rudder (not shown) of the airplane. Likewise, one of the output terminals of the elevator bridge 112 is connected to an amplifier 119 whose output controls a servo motor 120 connected by cables to the elevator (not shown) of the airplane. The bridges and networks are energized by alternating current, and the amplifiers 115, 117, and 119 are of a type which is responsive to a phase reversal of the incoming signal, and which provides an output signal capable of driving a reversing motor in either direction. It is to be understood that I do not claim the design or construction of the amplifiers 115, 117, and 119 and the servo motors 116, 118, and 120 as my invention, since such amplifiers and motors are well-known in the art and may be of a type such as shown in the patent to Whitman 1,942,587 or to Anschutz-Kaempfe 1,586,233.

Considering first the aileron bridge 110, it will be seen that this consists of a centering potentiometer 121, having a resistor 122 and a wiper 123, connected in parallel with a rebalancing potentiometer 124, consisting of a resistor 125 and a wiper 126. Power is supplied to the bridge 110 by a transformer 127, having a primary winding 128 which is connected to a suitable source of power (not shown), and a secondary winding 129 which is connected to the two potentiometers 121 and 124. It will be recognized that this is the well known Wheatstone bridge, with the wipers 123 and 126 forming the output terminals of the bridge. Wiper 126 is connected by a conductor 130 to the aileron amplifier 115, and wiper 123 is connected by conductor 131 to the adjusting network 113.

The adjusting network 113 includes the two adjusting potentiometers 105 and 106 previously mentioned in connection with the description of the fixed member 10. Potentiometer 105 includes resistor 132 and wiper 134, and potentiometer 106 includes resistor 133 and wiper 135. The resistors 132 and 133 are connected in parallel by conductors 136 and 137, and conductor 136 is grounded, while conductor 137 is connected to the control network 114 by conductor 153.

The controlling network 114 includes the potentiometer 37 previously described as being in the central housing 15 and consisting of the wiper 34 and resistor 36; and the ends of resistor 36 are connected to a source of power such as transformer 104 having a primary winding 138 and a secondary winding 139. Resistor 36 is provided with a center tap which is grounded at 140, and the secondary winding 139, the resistor 36, the wiper 34, and the ground connection 140 form the network 114 whose output terminals are the ground connection 140 and the wiper 34. Conductor 131 is connected to wiper 134 of the adjusting potentiometer 105, conductor 153 is connected to wiper 34, and the remaining input terminal of amplifier 115 is connected to ground by conductor 154.

A voltage circuit may now be traced for the aileron network, starting at ground connection 140 in control network 114, and continuing through wiper 34 and conductor 153 to adjusting network 113, through conductor 131 to the aileron bridge 110, from that bridge through conductor 130 to the amplifier 115, and from the amplifier the circuit is completed by connection 153 to ground and back to ground at 140.

Rudder bridge 111 is similar to aileron bridge 110 and includes a centering potentiometer 141, having a resistor 142 and a wiper 143, connected in parallel with a rebalancing potentiometer 144, having a resistor 145 and a wiper 146. A source of power is provided such as transformer 127 having a primary winding 128 and secondary winding 149. The secondary winding 149 is connected to the potentiometers 141 and 144, as in the aileron bridge 110, and wiper 146 is connected to one of the input terminals of amplifier 117 through a conductor 150. Similarly, wiper 143 is connected to wiper 135 of the adjusting network 113 by conductor 151, and the other input terminal of amplifier 117 is grounded by conductor 152.

The voltage circuit for the rudder system will thus be seen to go from ground 140 in the controlling network 114, through wiper 34 and conductor 153 to adjusting network 113, from there through resistor 133 and wiper 135 to conductor 151 and to bridge 111, through conductor 150 to amplifier 117, and from there to conductor 152 to ground and back to ground 140.

The control system for the elevator is very simple and consists of the elevator bridge 112, amplifier 119, and servo motor 120. The bridge 112 includes a rebalancing potentiometer 155, having a resistor 156 and a wiper 157, and resistor 156 is connected in parallel with resistor 76, which is mounted on the partition plate 70 in the upper housing 20. Wiper 74, which bears against resistor 76, is grounded at 158, and wiper 157 of the rebalancing potentiometer 155 is connected by conductor 160 to one of the input terminals of amplifier 119, and the other input terminal of the amplifier is grounded by conductor 161. Power is supplied to the bridge 112 by transformer 104 having a primary winding 138, and a secondary winding 162 which is connected to the resistors 156 and 76 so that the usual Wheatstone bridge results. The voltage circuit may thus be traced from the ground 159 through the bridge 112 and conductor 160 to amplifier 119 and then through conductor 161 to ground and back to ground 159.

It is to be noted that the transformer energizing the control network 114 is the same as that energizing the elevator bridge 112, though separate secondary windings are used for the networks and the bridge. In this way the bridge and the networks may be electrically isolated from each other while at the same time the number of transformers, and hence the cost, is held to a minimum. A similar arrangement may be used in the aileron and rudder bridges where I have shown a single transformer 127 provided with two secondary windings 129 and 149 for the aileron and rudder bridges 110 and 111, respectively. Similarly, transformers 104 and 127 may be combined into a single transformer having four or more secondary windings if this seems desirable. All of the transformer primaries and the amplifiers 115, 117, and 119 are energized from the same source of power (not shown) which may, for example, be the airplane's inverter.

While I have shown a circuit in which the control surfaces of the aircraft are positioned by the manual operation of my controller, it may also be used to modify the action of a gyroscopically stabilized autopilot. Under these conditions, switch contacts 60 and 61 may be used to control the erecting system of the gyroscope; and such a system is shown in the application of Robert J. Kutzler and Theodore J. Wilson, filed the same day as this.

*Operation of Figure 9*

Let is now be assumed that the airplane is proceeding in straight and level flight and is under control of the system shown in Figure 9. If it is desired to turn the airplane in azimuth, the handle 22 of the controller will be moved to one side so as to move the wiper 34 across the resistor 36. When this is done, a voltage will appear between ground 140 and the wiper 34, and this voltage will be transmitted to conductor 137 of network 113. Conductor 136 of network 113 is grounded, and the voltage appearing between wiper 34 and ground therefore appears between conductors 136 and 137 and is impressed across resistors 132 and 133 of the potentiometers 105 and 106. Any desired portion of this voltage may be selected by adjusting the position of wiper 134, and it will be transmitted by conductor 131 to aileron bridge 110.

The voltage appearing between the wipers 123 and 126 of the aileron bridge 110 will be dependent upon the relative position of these two wipers, and if the wipers are at similar positions on their respective resistors 122 and 125, the bridge will be in a condition of balance and there will be no voltage appearing between the wipers. Under normal conditions, the bridge 110 will be balanced when the wiper 34 is in its centered position; and hence in tracing the signal voltage from the controlling network 114, it will be assumed that the bridge 110 is balanced at the instant that the voltage from network 114 is first applied to bridge 110.

The voltage appearing between conductor 131 and ground is thus applied to bridge 110, and since there is no difference in potential between wipers 123 and 126, this same voltage appears between conductor 130 and ground and is applied to the input terminals of the amplifier 115. When a voltage is applied to the input terminals of the amplifier 115, the latter energizes the servo motor 116 to cause the latter to drive the ailerons. The wiper 126 is mechanically connected to the servo motor 116; and hence as the servo motor is operated, the wiper 126 is repositioned so that a voltage appears between it and wiper 123. By suitable connections, it is possible to have this voltage oppose that appearing between conductor 131 and ground, so that when the servo motor 116 has been operated the proper amount, the voltage from the bridge 110 equals but opposes the voltage from the two networks, and the signal received by the amplifier is reduced to zero. Under these conditions, the operation of the servo motor 116 ceases, and the ailerons are in a position corresponding to the position of the wiper 34 on the resistor 36.

When the wiper 34 is returned to its center position, it may be seen that conductor 131 is returned to ground potential, and the voltage appearing between the wipers 123 and 126 of the aileron bridge 110 will thus be applied to the input terminals of the amplifier 115. Since its phase is opposite to that of the signal previously applied, the servo motor 116 will operate in the opposite direction until the bridge 110 is again balanced.

It often happens that because of uneven loading of the airplane, one wing of the plane will be lower than the other if the ailerons are in streamlined position. If no means were provided to compensate for this, it would be necessary to hold the handle member 22 in a position displaced from center all the time the plane is to be flown in straight and level flight by means of this control system. This is obviously undesirable, and hence the centering potentiometer 121 is provided so that by displacing the wiper 123 along the resistor 122, the wiper 126 will be correspondingly displaced when the bridge 110 is in balance. This will cause the ailerons to be displaced from streamlined position when the wiper 34 is in its normal position, and the airplane will then fly with its wings level. Since the system shown is a self-balancing system, this balancing effect will take place as rapidly as the wiper 123 is moved; and when the bridge 110 has been balanced, the operation of the control network 114 and the adjusting network 113 is the same as that previously described.

The operation of the rudder system is similar in all respects to that of the aileron system just described, the desired portion of the voltage appearing between wiper 34 and ground being selected by the position of wiper 135 of the potentiometer 106 and transmitted by conductor 151 to the rudder bridge 111. Since the bridge 111 is balanced, as previously described in connection with the aileron bridge 110, the voltage appearing between conductor 151 and ground is conducted to the amplifier 117 which in turn causes the operation of the rudder servo motor 118 to reposition the rudder. Simultaneously, the wiper 146 of the rebalancing potentiometer 144 is moved to cause a voltage to appear between wipers 143 and 146 which will oppose and balance the voltage from the networks 113 and 114. When the wiper 34 is returned to center position, the voltage caused by the displacement of the wiper 146 will operate the amplifier 117 to drive the motor 118 in the opposite direction, thereby restoring the balance of the system and returning the rudder to its center or streamlined position. The centering potentiometer 141 is for the same purpose and operates in the same manner with respect to the rudder that the centering potentiometer 121 does with respect to the ailerons.

It will be seen that by providing the adjusting potentiometers 105 and 106, the amount of movement of the ailerons, caused by a given deflection of the wiper 34 may be varied by changing the position of the wiper 134 so that a greater or lesser portion of the voltage from the control network 114 is transmitted to the bridge 110. Similarly, the voltage transmitted to the rudder bridge 111 may be independently varied by changing the position of wiper 135 on resistor 133, and it is thus possible to select any desired ratio of movement of the aileron and rudder so that a coordinated turn may be made in any airplane.

The elevator circuit shown is very simple, consisting solely of the Wheatstone bridge 112 which has previously been described. The wiper 157 of the rebalancing potentiometer 155 is positioned by the servo motor 120; and any time the bridge 112 is unbalanced, a signal is transmitted to the amplifier 119 which then operates the servo motor 120 in a direction to cause wiper 157 to rebalance the bridge. Thus when the wiper 74 is moved across the resistor 76, the bridge 112 is unbalanced and servo motor 120 drives until the wiper 157 has again restored the bridge to balance. At the same time, the elevator of the airplane has been moved, so that the effect of moving the handle 22 backward and forward is the same as the effect of moving the usual stick or control column of an airplane backward and forward.

It will thus be seen that the use of my controller provides a control for an airplane which is very similar to that provided by the usual manual controls thereof, but the force required to move the controller will be much smaller than that required to move the control surfaces of the plane by the use of the manual controls, and hence pilot fatigue will greatly be reduced. It is again repeated, however, that the use of the particular control system shown in Figure 9 is not necessary to the operation of my controller, since many other systems may be used. The system shown herein is by way of example only, and I do not claim the control system as shown in Figure 9 as my invention.

Since the pilot of the plane will normally have his hand upon the handle 22 at all times while the plane is being controlled by means of my controller, it is very convenient and desirable for him to have a switch incorporated in that handle so that he may operate the intercommunicating equipment of the plane without having to remove his hand from the handle. Consequently, I have provided, as shown in Figures 1, 6, and 7, a switch operator 170 which may be operated by the index finger of the pilot. When the operator 170 is pressed into the handle 22, a pair of switch blades 171 and 172 with their associated contacts are pressed into contact with a third switch blade 173 which is generally at ground potential. Connection may be made to the blades 171 and 172 to operate the interphone equipment either directly or by means of relays, depending upon the particular system used in the plane. As shown in Figure 7, the switch blades may be connected by wires which extend down through the handle 22 and then through the upper housing 20, the central housing 15, and on down through the lower housing 10 where they may be connected to the separable connector 100.

If the pilot and copilot of a plane are each provided with one of my controllers, it is desirable for them to be able to switch control of the plane from one controller to the other and not to have both controllers operative at the same time. This will usually be done by means of a relay, and to operate this relay, I have shown a push button switch in the top of the handle member 22, consisting of a push button 174 which may urge a switch blade 175 against the grounded switch blade 173. Connection may be made to switch blade 175 through the handle member 22, in a manner similar to that previously described for the connections to switch blades 171, 172, and 173, and the control or transfer may be secured by a control circuit of any suitable type, which forms no part of my invention.

It will thus be seen that I have provided a simple and compact controller capable of simultaneously and independently controlling two separate systems with a high degree of precision. The provision of the spring centering means insures that the controller will always return to its center or neutral position, and in addition, produces a highly desirable psychological effect while giving the operator the "feel" of the system. My use of the centrifugal brake prevents the overshooting or hunting of the controller and likewise prevents its being moved so rapidly as to cause a serious disturbance of the objects controled. Furthermore, since a different amount of force is required to move the controller in one plane than in the other, the proper "feel" of the controller may be maintained without unduly tiring of the operator.

It is to be understood that while I have shown and described my controller as being applied to the control of an airplane, its use is not restricted to this but may be used wherever two independent systems must be simultaneously and independently controlled. Similarly, the control circuit I have shown for use with my controller is given by way of example only and not by way of defining the invention. While I have shown and described a preferred form of my invention, I do not wish to be limited to the particular form or arrangement of parts herein described and shown except as particularly covered by my claims.

I claim as my invention:

1. A manually operable controller of the class described which includes: a fixed member; a first movable member pivotally attached to said fixed member for movement in a first plane; a first spring means urging said first movable member to a predetermined normal position; a second movable member adapted for manual actuation and pivotally attached to said first movable member for movement with respect to said latter member in a plane at an angle to said first plane; a second spring means urging said second movable member to a predetermined normal position whereby a greater force is required to move said second member about the axis of said second member than about the axis of said first member; a first variable impedance controlled by movement of said first movable member; and a second variable impedance controlled by movement of said second movable member.

2. A manually operable controller of the class described which includes: a fixed member; a first movable member pivotally attached to said fixed member for movement in a first plane; a first spring means urging said first movable member to a predetermined normal position, said spring means having a substantially constant spring rate over the range to which it is subjected; a second movable member adapted for manual actuation pivotally attached to said first movable member for movement with respect to said latter member in a plane at an angle to said first plane, the axis of said members being in spaced parallel planes; a second spring means similar to said first spring means urging said second movable member to a predetermined normal position; a first variable impedance controlled by movement of said first movable member; and a second variable impedance controlled by movement of said second movable member.

3. A manually operable controller of the class described which includes: a fixed member; a first movable member pivotally attached to said fixed member; a first spring means having a substantially constant spring rate and acting to return said first movable member to a predetermined normal position, said spring means comprising a pair of pivotal arms connected by a spring and adapted to be moved against the urging of said spring by the movement of said first movable member adapted for manual actuation and; a second movable member pivotally attached to said first movable member with its pivotal axis at an angle to the pivotal axis of said first movable member the axes of said first and second members being in spaced parallel planes; a second spring means similar to said first spring means and having a substantially constant spring rate and acting to return said second movable member to a predetermined normal position, said spring means comprising a pair of pivotal arms connected by a spring and adapted to be moved against the urging of said spring by the movement of said second movable member with respect to said first movable member; a first variable impedance controlled by the movement of said first movable member with respect to said fixed member; and a second variable impedance controlled by the movement of said second movable member with respect to said first movable member.

4. A controller of the class described which includes: a fixed member; a first movable member pivotally attached at one end to said fixed member for movement in a first plane; a first spring means located at the point of attachment of said first movable member to said fixed member, having a substantially constant spring rate, and acting to return said first movable member to a predetermined normal position with respect to said fixed member, said spring means comprising a pair of pivoted arms connected at their ends by a spring and adapted to be moved apart against the urging of said spring by the movement of said first movable member with respect to said fixed member; a second movable member pivotally attached at one end to the other end of said first movable member for independent movement with respect to said first movable member in a plane perpendicular to said first plane; a second spring means located at the point of attachment of said second movable member to said first movable member, having a substantially constant spring rate, and acting to return said second movable member to a predetermined normal position with respect to said first movable member, said spring means comprising a pair of pivoted arms connected at their ends by a spring and adapted to be moved apart against the urging of said spring by the movement of said second movable member with respect to said first movable member; a first variable impedance located at the point of attachment of said first movable member to said fixed member and controlled by the movement of said first movable member with respect to said fixed member; and a second variable impedance located at the point of attachment of said second movable member to said first movable member and controlled by the movement of said second movable member with respect to said first movable member.

5. A manually operable controller of the class described which includes: a fixed member; a first movable member pivotally attached to said fixed member; a first rate limiting means driven by said first movable member and resisting the movement of said first movable member with respect to said fixed member; a second movable member adapted for manual actuation pivotally attached to said first movable member with its pivotal axis at an angle to the pivotal axis of said first movable member; a second rate limiting means driven by said second movable member and resisting the movement of said first movable member with respect to said first movable member; a first variable impedance controlled by the movement of said first movable member with respect to said fixed member; and a second variable impedance controlled by the movement of said second movable member with respect to said first movable member.

6. A controller of the class described which includes: a fixed member; a first movable member pivotally attached at one end to said fixed member for movement in a first plane; a first centrifugal brake located at the point of attachment of said first movable member to said fixed member, operated by movement of said first movable member with respect to said fixed member, and resisting said movement in ratio to the speed of said movement; a second movable member pivotally attached at one end to the other end of said first movable member for independent movement with respect to said first movable member in a plane perpendicular to said first plane; a second centrifugal brake located at the point of attachment of said second movable member to said first movable member, operated by movement of said second movable member with respect to said first movable member, and resisting said movement in ratio to the speed of said movement; a first variable impedance controlled by movement of said first movable member with respect to said fixed member; and a second variable impedance controlled by movement of said second movable member with respect to said first movable member.

7. A manually operable controller of the class described which includes: a fixed member; a first movable member pivotally attached to said fixed member; a first spring means urging said first movable member to a predetermined normal position; a first rate limiting means resisting the movement of said first movable member with respect to said fixed member; a second movable member adapted for manual actuation and pivotally attached to said first movable member with its pivotal axis at an angle to the pivotal axis of said first movable member; a second spring means urging said second movable member to a predetermined normal position; a second rate limiting means resisting the movement of said second movable member with respect to said first movable member; a first variable impedance controlled by the movement of said first movable member with respect to said fixed member; and a second variable impedance controlled by the movement of said second movable member with respect to said first movable member.

8. A controller of the class described which includes: a fixed member; a first movable member pivotally attached at one end to said fixed member for movement in a first plane; a first spring means located at the point of attachment of said first movable member to said fixed member, having a substantially constant spring rate, and acting to return said first movable member to a predetermined normal position with respect to said fixed member, said spring means comprising a pair of pivoted arms connected at their ends by a spring and adapted to be moved apart against the urging of said spring by the movement of said first movable member with respect to said fixed member; a first centrifugal brake located at the point of attachment of said first movable member to said fixed member, operated by movement of said first movable member with respect to said fixed member, and resisting said movement in ratio to the speed of said movement; a second movable member pivotally attached at one end to the other end of said first movable member for independent movement with respect to said first movable member in a plane perpendicular to said first plane; a second spring means located at the point of attachment of said second movable member to said first movable member, having a substantially constant spring rate, and acting to return said second movable member to a predetermined normal position with respect to said first movable member, said spring means comprising a pair of pivoted arms connected at their ends by a spring and adapted to be moved apart against the urging of such spring by the movement of said second movable member with respect to said first movable member; a second centrifugal brake located at the point of attachment of said second movable member to said first movable member, operated by movement of said second movable member with respect to said first movable member, and resisting said movement in ratio to the speed of said movement; a first variable impedance controlled by movement of said first movable member with respect to said fixed member; and a second variable impedance controlled by movement of said second movable member with respect to said first movable member.

9. A manual controller of the class described which includes: a fixed member; a movable member connected to said fixed member for movement in two different planes with respect thereto; spring means urging said movable member to a predetermined normal position in both of said planes, said movable member and said spring means being so arranged as to require a greater force to be applied to said movable member to move it in one plane than in the other; a first variable impedance means controlled by the movement of said movable member in one of its planes; and a second variable impedance means controlled by the movement of said movable member in the second of its planes of movement.

10. A manual controller of the class described which includes: a fixed member; a movable member connected to said fixed member for movement in two different planes with respect thereto; rate limiting means resisting the movement of said movable member in both of said planes, said movable member and said rate limiting means being so arranged as to require a greater force to be applied to said movable member to move it in one plane than in the other; a first variable impedance means controlled by the movement of said movable member in a first plane; and a second variable impedance means controlled by the movement of said movable member in the second of its planes of movement.

11. A manually operable controller of the class described which includes: a fixed member; a movable member connected to said fixed member for movement in two different planes with respect thereto; spring means urging said movable member to a predetermined normal position in both of said planes; rate limiting means resisting the movement of said movable member in both of said planes, said movable member, said spring means, and said restraining means being so arranged as to require a greater force to be applied to said movable member to move it in one plane than in the other; and variable impedance means controlled by movement of said movable member.

12. A manually operable controller of the class described which includes: a fixed member; a first movable member pivotally attached to said fixed member for movement in a first plane; a first spring means urging said first movable member to a predetermined normal position; a second movable member pivotally attached to said first movable member for movement with respect to said latter member in a plane at an angle to said first plane; a second spring means urging said second movable member to a predetermined normal position, said first spring means and said second spring means being coordinated with the arrangement of said first and second movable members so that a greater force is required to move said second movable member with respect to said first movable member than to move said first movable member with respect to said fixed member; a first variable impedance controlled by the movement of said first movable member; and a second variable impedance controlled by movement of said second movable member.

13. A controller of the class described which includes: a fixed member; a first movable member pivotally attached at one end to said fixed member for movement in a first plane; a first centrifugal brake located at the point of attachment of said first movable member to said fixed member, operated by movement of said first movable member with respect to said fixed member, and resisting said movement in ratio to the speed of said movement; a second movable member pivotally attached at one end to the other end of said first movable member for independent movement with respect to said first movable member in a plane perpendicular to said first plane; a second centrifugal brake located at the point of attachment of said second movable member to said first movable member; operated by movement of said second movable member with respect to said first movable member, and resisting said movement in ratio to the speed of said movement, said first and second centrifugal brakes being coordinated with the arrangement of said first and second movable members so that a greater force is required to move said second movable member with respect to said first movable member than to move said first movable member with respect to said fixed member; a first variable impedance controlled by the movement of said first movable member with respect to said fixed member; and a second variable impedance controlled by movement of said second movable member with respect to said first movable member.

14. A controller of the class described which includes: a fixed member; a first movable member pivotally attached at one end to said fixed member for movement in a first plane; a first spring means located at the point of attachment of said first movable member to said fixed member, having a substantially constant spring rate, and acting to return said first movable member to a predetermined normal position with respect to said fixed member, said spring means comprising a pair of pivoted arms connected at their ends by a spring and adapted to be moved apart against the urging of said spring by the movement of said first movable member with respect to said fixed member; a first centrifugal brake located at the point of attachment of said first movable member to said fixed member, operated by movement of said first movable member with respect to said fixed member, and resisting said movement in ratio to the speed of said movement; a first variable impedance means located at the point of attachment of said first movable member to said fixed member and controlled by movement of said first movable member with respect to said fixed member; a second movable member pivotally attached at one end to the other end of said first movable member for independent movement with respect to said first movable member in a plane perpendicular to said first plane; a second spring means located at the point of attachment of said second movable member to said first movable member, having substantially constant spring rate, and acting to return said second movable member to a predetermined normal position with respect to said first movable member, said spring means comprising a pair of pivoted arms connected at their ends by a spring and adapted to be moved apart against the urging of such spring by the movement of said second movable member with respect to said first movable member; a second centrifugal brake located at the point of attachment of said second movable member to said first movable member, operated by movement of said second movable member with respect to said first movable member, and resisting said movement in ratio to the speed of said movement, said first and second centrifugal brakes and said first and second spring means being coordinated with the arrangement of said first and second movable members so that a greater force is required to move said second movable member with respect to said first movable member than is required to move said first movable member with respect to said fixed member; and a second variable impedance located at the point of attachment of said second movable member to said first movable member, and controlled by movement of said second movable member with respect to said first movable member.

15. A manually operable controller of the class described which includes: a fixed member; a first movable member pivotally attached to said fixed member; a second movable member adapted for manual actuation pivotally attached to said first movable member with its pivotal axis at an angle to the pivotal axis of said first movable member; variable rate limiting means driven by one of said movable members and resisting the movement of said one of said movable members, said rate limiting means providing a restraint which varies with the speed of movement of said movable member; and a variable impedance controlled by movement of one of said movable members.

16. A manually operable controller of the class described comprising: a fixed member, a first movable member mounted on said fixed member, a second movable member adapted for manual actuation and movably mounted on said first movable member for movement in a plane at an angle to the plane of movement of said first member, means urging said first member to a normal position with respect to said fixed member, means urging said second member to a normal position with respect to said first movable member, said urging means being so arranged as to require a greater force to move said second member with respect to said first movable member than is required to move said first movable member with respect to said fixed member.

17. A manually operable controller of the class described comprising: a fixed member, a first movable member mounted on said fixed member, a second movable member adapted for manual actuation and movably mounted on said first movable member for movement in a plane at an angle to the plane of movement of said first movable member, rate limiting means resisting the movement of said first movable member with respect to said fixed member, rate limiting means resisting the movement of said second movable member with respect to said first movable member, said movable members and said rate limiting means being so arranged as to require a greater force to be applied to said controller to move it in one plane than in the other, and variable control means controlled by the movement of said controller.

LEONARD E. ASKE.

REFERENCES CITED

The following references are of record in the file of this patent:

UNITED STATES PATENTS

| Number | Name | Date |
| --- | --- | --- |
| 2,144,616 | Carlson | Jan. 24, 1939 |
| 2,182,123 | Grisdale | Dec. 5, 1939 |
| 2,198,523 | Adams | Apr. 23, 1940 |
| 2,337,166 | Overbeke | Dec. 21, 1943 |